No. 842,695. PATENTED JAN. 29, 1907.
C. R. PETERS.
CAMP BROILER.
APPLICATION FILED JUNE 19, 1905.
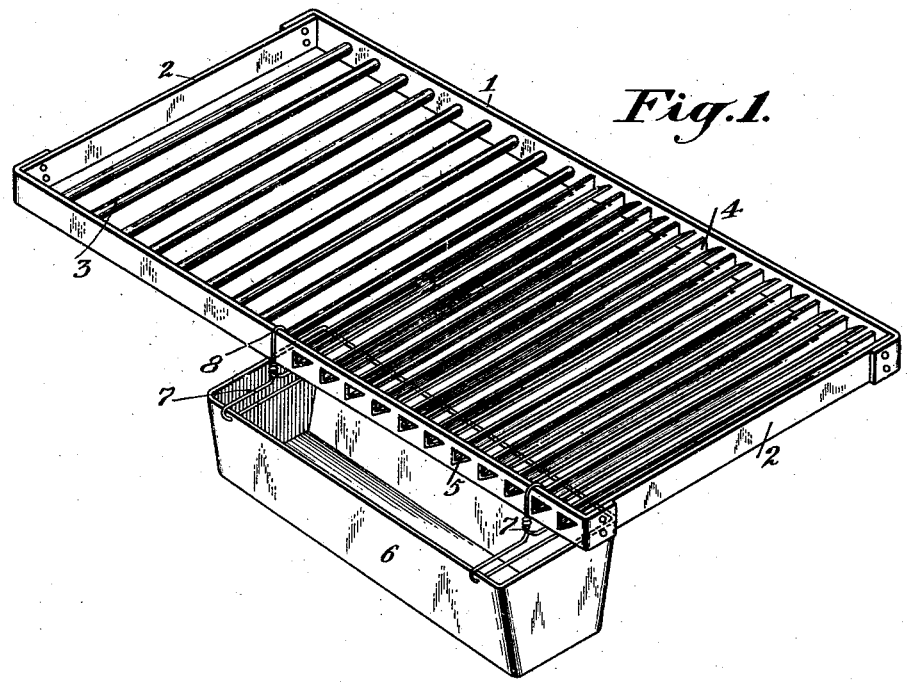
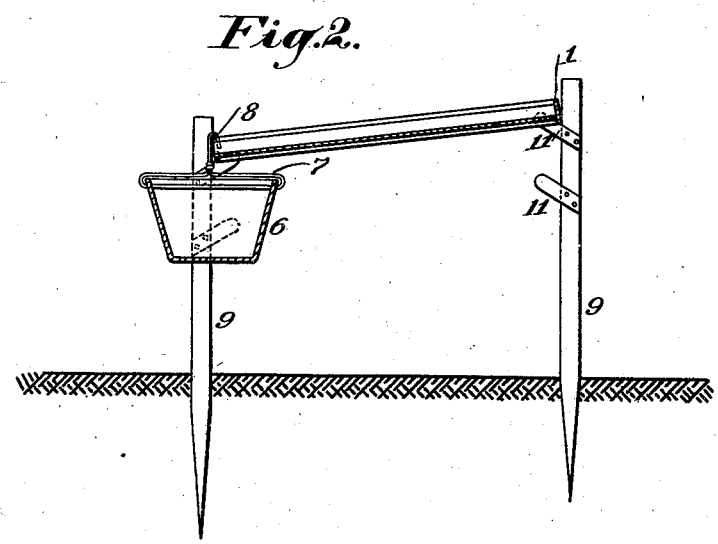
Witnesses:—
F. C. Fliedner
M. R. Seely
Inventor,
Charles Rollo Peters,
by Spear & Seely
Attorneys
THE NORRIS PETERS CO., WASHINGTON, D. C.

UNITED STATES PATENT OFFICE.

CHARLES ROLLO PETERS, OF MONTEREY, CALIFORNIA.

CAMP-BROILER.

No. 842,695.   Specification of Letters Patent.   Patented Jan. 29, 1907.

Application filed June 19, 1905. Serial No. 266,006.

*To all whom it may concern:*

Be it known that I, CHARLES ROLLO PETERS, a citizen of the United States, residing at Monterey, in the county of Monterey and State of California, have invented certain new and useful Improvements in Camp-Broilers, of which the following is a specification.

My invention relates to portable cooking apparatus, and more particularly to an improved form of broiler intended especially for outdoor use by campers and the like, but capable of being employed to advantage in many other situations.

One part of my invention refers to improvements in the broiler or gridiron proper, while another part has especial reference to its outdoor use and the manner of supporting and adjusting it to the best advantage.

An embodiment of my invention is shown in the accompanying drawings, in which—

Figure 1 is a perspective view of the broiler proper. Fig. 2 is an end view showing the broiler as supported and adjusted, the broiler itself and the drip-pan being shown in cross-section.

The broiler is composed of side bars 1 and end bars 2, riveted or otherwise secured together to form a rectangular frame. For about one-half the length of the frame its side bars are connected by transverse rods 3, forming a gridiron. The remaining part of the frame is provided with V-shaped transverse bars 4, which pass through similarly-shaped holes 5 in the side bars and are secured in such bars preferably by bending down and riveting their ends. The manner of securing them is, however, immaterial, the intention being to provide a series of transverse channels which at one side or both sides of the frame enter openings in the side bars of said frame, which form outlets for the juices of the meat in process of broiling. When I say that openings 5 can be formed in both side bars I mean that while the openings in only one side form outlets for juices and gravy, yet it may be convenient to have such openings in both side bars. Only the series of such openings upon one side would ordinarily be used in cooking.

A dripping-pan 6 is adapted to be supported at one side of the broiler in proximity to and beneath the outlet-openings 5. Such a pan is shown in the drawings as provided with wire hangers 7, having hooks 8, which are hooked over one of the side bars of the broiler, the hooks of such hangers coming at or near the middle line of the dripping-pan, so that the pan shall come well beneath the edge of the broiler and extend lengthwise beneath it as far as the series of channel-bars extends.

This broiler being primarily intended for outdoor use, as in camps and the like, is provided with simple and convenient means for supporting it at the proper angle over the fire, so as to receive the full effect of a hot broiling-fire and to preserve the juice which escapes into the channel-bars. This support consists of the corner-posts 9, of which two are shown in Fig. 2, it being supposed that four are actually employed, one at each corner of the broiler. These posts 9 have sharpened ends, so that they can be easily driven into the ground. They are further provided with upwardly-inclined projections or lugs 11, formed with or secured to them, two of which lugs are shown upon each post, although a greater number can be used.

When the spot has been selected for the camp-fire, the posts are driven into the ground to a greater or less extent, so as, first, to make a firm rigid support for the broiler, and, secondly, to bring the supporting projections to such levels as to give the broiler a proper inclination when its side bars rest upon them. For this reason each leg has a series of such projections, so that the proper levels can be easily found.

The part of the broiler which has the transverse grooved bars is placed above the fire, as it is here that the quick broiling takes place. In preparing a meal for a large party the ends of the gridiron provided with plain cross-rods and which is not directly above the fire, but is exposed to its heat, is used as a receptacle for the steaks, chops, or the like as cooked in order to keep them hot.

This invention solves one of the great difficulties and does away with one of the great inconveniences of camping life in that it furnishes a quick broiler provided with means for saving the juices of the meat, furnishes a receptacle where cooked meat can be kept hot while more is being broiled, and is provided with a support which is adapted to be placed in the proper relation to the fire to enable the broiler to accomplish the above-stated objects.

The attachable and removable dripping-pan affords a great convenience in camp life, as it can be kept clean as a separate utensil, not forming an integral part of the broiler itself.

It will be particularly observed that a very large broiler can be made of very light material and be properly supported, and, further, that the grooved bars are set closely together, as shown, so that practically no gravy falls into the fire, but is saved in the dripping-pan without interfering with the broiling action and at the same time preserving a clear open fire.

Having thus described my invention, what I claim as new, and desire to secure by Letters Patent, is—

1. A camp-broiler comprising a substantially rectangular frame, solid rods connecting the side bars of said frame throughout a part of its length, V-shaped bars connecting the said side bars throughout the remainder of the length of said frame, and a removable pan having means for suspending it from the side of said frame with one edge extending under the frame.

2. A camp-broiler comprising a substantially rectangular frame, solid rods connecting its side bars throughout a portion of its length, and channels or troughs connecting the said side bars throughout the remainder of the length of the frame; the said side bars being perforated to receive said channel-bars.

3. A camp-broiler comprising a frame, solid bars extending across said frame for a portion of its length, channel-bars extending across said frame for the remainder of its length, and communicating with openings in said frame, a dripping-pan removably attached to said frame, and independent supporting-legs having lugs for receiving and supporting the frame.

In testimony whereof I have affixed my signature, in presence of two witnesses, this 10th day of June, 1905.

CHARLES ROLLO PETERS.

Witnesses:
   CHARLES CARR,
   ADDIE GIANINA.